United States Patent [19]

De Jong et al.

[11] Patent Number: 5,486,313
[45] Date of Patent: Jan. 23, 1996

[54] PROCESS FOR THE PREPARATION OF CARBON MONOXIDE AND/OR HYDROGEN

[75] Inventors: Krijn P. De Jong; Peter W. Lednor; Anna E. M. Oud; Ronald J. Schoonebeek; Koert A. Vonkeman; Gerardus P. Van Der Zwet, all of Amsterdam, Netherlands

[73] Assignee: Shell Oil Company, Houston, Tex.

[21] Appl. No.: 361,358

[22] Filed: Dec. 21, 1994

[30] Foreign Application Priority Data

Dec. 27, 1993 [EP] European Pat. Off. .............. 93203705

[51] Int. Cl.$^6$ ............................................... C07C 1/02
[52] U.S. Cl. ............................................ 252/373; 252/372
[58] Field of Search ................................... 252/372, 373

[56] References Cited

U.S. PATENT DOCUMENTS 5,149,464  9/1992  Green et al. ............................ 252/373

FOREIGN PATENT DOCUMENTS

| 0303438 | 2/1989 | European Pat. Off. . |
| 0262947B1 | 6/1992 | European Pat. Off. . |
| 92/11199 | 7/1992 | WIPO . |
| 93/01130 | 1/1993 | WIPO . |

OTHER PUBLICATIONS

"Catalytic Partial Oxidation of Methane Over a Monolith Supported Catalyst," Hockmuth, Applied Cat B: Environ., 1 (1992) 89–100.

"Partial Oxidation of Methane to Synthesis Gas, and Carbon Dioxide as an Oxidizing Agent for Methane Conversion," Vernon et al, Cat Today, 13 (1992) 417–426.

"Synthesis Gas Formation by Direct Oxidation of Methane over Pt. Monoliths," Hickman et al, Journal of Catalysis 138, 267–282, 1992.

"Catalytic Conversion of Methane to Synthesis Gas over Europium Iridate, $Eu_2IR_2O_7$," Jones et al, Cat Letters 8 (1991) 169–174.

"Partial Oxidation of Methane to Synthesis Gas," Vernon et al, Catalysis Letters 6 (1990) 181–186.

"Selective Oxidation of Methane to Synthesis Gas Using Transition Metal Catalysts," Ashcroft et al, Nature, vol. 344, No. 6264, pp. 319–321, Mar. 22, 1990.

Primary Examiner—Werren B. Lone

[57] ABSTRACT

The present invention provides a process for the preparation of carbon monoxide and/or hydrogen from a hydrocarbon feedstock. The hydrocarbon feedstock is subjected in a first stage to a catalytic partial oxidation process in which it is contacted, as a gaseous mixture comprising the hydrocarbon feedstock and an oxygen-containing gas, which gaseous mixture also comprises nitrogen, with a catalyst comprising as a catalytically active metal rhodium, iridium or platinum. At least a portion of the products of the first stage is subjected in a second stage to a process in which ammonia and/or hydrogen cyanide is removed.

14 Claims, 1 Drawing Sheet

PROCESS FOR THE PREPARATION OF CARBON MONOXIDE AND/OR HYDROGEN

FIELD OF THE INVENTION

The present invention relates to a process for the preparation of carbon monoxide and/or hydrogen from a hydrocarbon feedstock, such as methane, natural gas or associated gas. More specifically, the present invention relates to a process for the preparation of carbon monoxide and/or hydrogen by the catalytic partial oxidation of the hydrocarbon feedstock.

BACKGROUND OF THE INVENTION

The partial oxidation of hydrocarbons, for example methane or natural gas, in the presence of a catalyst is an attractive route for the preparation of mixtures of carbon monoxide and hydrogen, known in the art as synthesis gas. The partial oxidation of a hydrocarbon is a highly exothermic reaction and, in the case in which methane is the hydrocarbon, proceeds by the following reaction:

$$2CH_4 + O_2 \rightarrow 2CO + 4H_2$$

The optimum catalytic partial oxidation process for application on a commercial scale would give high yields of carbon monoxide and hydrogen at elevated pressures, for example about 30 bar, and high space velocities, for example of the order of 1,000,000 Nl/kg/h. For thermodynamic reasons, in order to obtain high yields of carbon monoxide and hydrogen under these process conditions, it is necessary to operate the partial oxidation process at high temperatures.

The literature contains a number of documents disclosing details of experiments conducted into the catalytic partial oxidation of hydrocarbons, in particular methane, employing a wide range of catalysts. The majority of these experiments, however, have been conducted under very mild conditions or under conditions wholly unsuited to the operation of a commercial catalytic partial oxidation process.

Thus, European Patent Application publication No. 0 303 438 (EP-A-0 303 438) discloses a process for the catalytic partial oxidation of a hydrocarbonaceous feedstock in which a gaseous mixture of the hydrocarbonaceous feedstock, oxygen or an oxygen-containing gas and, optionally, steam, is introduced into a catalytic partial oxidation zone to contact a catalyst retained therein. The catalyst employed in the process may comprise a wide range of catalytically active components, for example palladium, platinum, rhodium, iridium, osmium, ruthenium, nickel, chromium, cobalt, cerium, lanthanum and mixtures thereof. Further, it is stated in EP-A-0 303 438 that materials not normally considered to be catalytically active may also be employed as catalysts, for example refractory oxides such as cordierite, mullite, mullite aluminum titanate, zirconia spinels and alumina. The catalyst may be of a variety of forms, for example sheets of corrugated metal packed to form elongate channels therethrough or wire mesh. However, preference is given in EP-A-0 303 438 to the use of catalysts in the form of monoliths.

European Patent No. 0 262 947 (EP-B-0 262 947) discloses a process for generating hydrogen by the partial oxidation of a hydrocarbon in which a mixture of the hydrocarbon and oxygen is injected into a mass of a catalyst. The catalyst disclosed in EP-B-0 262 947 comprises platinum and chromium oxide supported on a refractory solid.

D. A. Hickman and L. D. Schmidt ("Synthesis Gas Formation by Direct Oxidation of Methane over Pt Monoliths", Journal of Catalysis 138, 267–282, 1992)) have conducted experiments into the partial oxidation of methane in the presence of catalysts comprising either platinum or rhodium. The catalysts employed were in the form of a polycrystalline platinum foil or rhodium or platinum supported on a ceramic foam carrier. The partial oxidation reactions were conducted at substantially atmospheric pressure and at temperatures in the range of from 600 to 1500 K (337° to 1237° C.).

A. T. Ashcroft et al. ("Selective oxidation of methane to synthesis gas using transition metal catalysts", Nature, vol. 344, No. 6264, pages 319 to 321, 22nd March, 1990) disclose the partial oxidation of methane to synthesis gas in the presence of a range of ruthenium-containing catalysts. The objective of the experiments was to establish that the partial oxidation process could be carried out under mild conditions and at low temperatures. To this end, the experiments were conducted with a low gas hourly space velocity of 40,000/hr, a pressure of 1 atmosphere and a temperature of about 777° C. A single experiment is reported in which elevated pressures were applied. However, in this case, a large excess of methane was used in order to avoid the risk of explosions.

P. D. F. Vernon et al. ("Partial Oxidation of methane to Synthesis Gas", Catalysis Letters 6(1990) 181–186) disclose a range of experiments in which catalysts comprising nickel, ruthenium, rhodium, palladium, iridium or platinum, either supported on alumina or present in mixed oxide precursors, were applied. Again, the experiments reported are limited to a catalytic partial oxidation process employing only mild operating conditions. As a basis, a set of mild reaction conditions were selected: a pressure of 1 atmosphere, a gas hourly space velocity of 40,000/hr, a temperature of 1050 K (777° C.) and a methane/oxygen ratio of 2.0. From this basis, each of the process parameters was explored. From this study it was concluded that the low temperature operation gave certain operating advantages, but was only practicable at pressures of the order of 1 atmosphere. The authors report the same experiments in "Partial Oxidation of Methane to Synthesis Gas, and Carbon Dioxide as an Oxidizing Agent for Methane Conversion", Catalysis Today, 13 (1992) 417–426.

R. H. Jones et al. ("Catalytic Conversion of Methane to Synthesis Gas over Europium Iridate, Eu$_2$Ir2O$_7$", Catalysis Letters 8 (1991) 169–174) report the selective partial oxidation of methane using the curopium iridium pyrochlore Eu$_2$Ir$_2$O$_7$. The reaction was studied under the mild conditions of a pressure of 1 atmosphere and a temperature of 873 K (600° C.).

J. K. Hockmuth ("Catalytic Partial Oxidation of Methane over a monolith Supported Catalyst", Applied Catalysis B: Environmental, 1 (1992) 89–100) reports the catalytic partial oxidation of methane using a catalyst comprising a combination of platinum and palladium supported on a cordierite monolith body.

U.S. Pat. No. 5,149,464 is directed to a method for selectively oxygenating methane to carbon monoxide and hydrogen by bringing the reactant gas mixture at a temperature of about 650° C. to 900° C. into contact with a solid catalyst which is generally described as being either:

a) a catalyst of the formula M×M'yOz, where:

M is at least one element selected from Mg, B, Al, Ln, Ca, Si, Ti, Zr and Hf; Ln is at least one member of lanthanum and the lanthanide series of elements;

M' is a d-block transition metal, and each of the ratios x/y and y/z and (x+y)/z is independently from 0.1 to 8; or b) an oxide of a d-block transition metal; or c) a d-block transition metal on a refractory support; or d) a catalyst formed by heating a) or b) under the conditions of the reaction or under non-oxidizing conditions.

The d-block transition metals are said in U.S. Pat. No. 5,149,464 to be selected from those having atomic number 21 to 29, 40 to 47 and 72 to 79, the metals scandium, titanium, vanadium, chromium, manganese, iron, cobalt, nickel, copper, zirconium, niobium, molybdenum, technetium, ruthenium, rhodium, palladium, silver, hafnium, tantalum, tungsten, rhenium, osmium, iridium, platinum and gold. It is stated in U.S. Pat. No. 5,149,464 that the preferred metals are those in Group VIII of the Periodic Table of the Elements, that is iron, osmium, cobalt, rhenium, iridium, palladium, platinum, nickel and ruthenium.

The process described in U.S. Pat. No. 5,149,464 is operated at a temperature in the range of from 650° C. to 900° C., with a range of from 700° C. to 800° C. being preferred. A range of experiments are described in U.S. Pat. No. 5,149,464 in which a variety of catalysts comprising Group VIII metals were tested, including ruthenium oxide, praesidium/ruthenium oxides, pyrochlores, ruthenium on alumina, rhodium on alumina, palladium on alumina, platinum on alumina, nickel/aluminum oxide, perovskites and nickel oxide.

A similar general disclosure of a catalyst for use in the catalytic partial oxidation process is made in International Patent Application publication No. WO 92/11199. WO 92/11199 specifically discloses experiments in which catalysts comprising iridium, palladium, ruthenium, rhodium, nickel and platinum supported on alumina were applied. All the experiments were conducted under mild process conditions, with typical conditions being a pressure of 1 atmosphere, a temperature of 1050 K (777° C.) and a gas hourly space velocity of about 20,000/hr.

As discussed hereinbefore, to be effective on a commercial scale, the catalytic partial oxidation process would need to operate at elevated pressures and at high temperatures. It has now been found that, when operated under the conditions demanded of a commercial process, the catalytic partial oxidation of hydrocarbons can, in the presence of nitrogen, yield a synthesis gas product containing a number of by-products, in particular ammonia ($NH_3$) and hydrogen cyanide (HCN), in low but significant amounts. It has been found that such by-products can adversely affect downstream processes to convert the carbon monoxide and/or hydrogen produced by the catalytic partial oxidation process, e.g. in the case of Fischer-Tropsch synthesis or of the synthesis of methanol. The presence of by-products, in particular ammonia or hydrogen cyanide, in the products of the catalytic partial oxidation process is thus undesirable.

For processes in which the formation of synthesis gas comprising ammonia or hydrogen cyanide cannot be avoided, it is known to subject the synthesis gas to a cleaning treatment, for example scrubbing with water, to reduce the ammonia and hydrogen cyanide content of the gas to tolerable levels. However, the need for such a cleaning treatment increases the capital and operating costs of a commercial plant.

Nitrogen is present in many natural gas feedstocks. Further, the preparation of pure, nitrogen-free oxygen on a commercial scale is both very expensive and technically difficult. Accordingly, there is a need for a process for the catalytic partial oxidation of hydrocarbons when nitrogen is present during the partial oxidation reactions which may be applied on a commercial scale to produce a product of carbon monoxide and/or hydrogen containing a minimum of components such as ammonia and hydrogen cyanide.

Surprisingly, it has now been found that, by employing in the catalytic partial oxidation process a catalyst comprising rhodium, iridium or platinum as the catalytically active component, significantly lower amounts of ammonia and hydrogen cyanide are generated than with the other metals known to be active.

SUMMARY OF THE INVENTION

The present invention provides a process for the preparation of carbon monoxide and/or hydrogen from a hydrocarbon feedstock, which process comprises subjecting the hydrocarbon feedstock in a first stage to a catalytic partial oxidation process comprising contacting a gaseous mixture comprising the hydrocarbon feedstock and an oxygen-containing gas, which gaseous mixture also comprises nitrogen, with a catalyst comprising as a catalytically active metal rhodium, iridium or platinum and subjecting at least a portion of the products of the first stage in a second stage to a process in which ammonia and/or hydrogen cyanide is removed.

The process of the present invention offers the significant advantage that, owing to the very low amounts of ammonia and hydrogen cyanide produced in the first stage, removal of the undesirable components from the products is a relatively simple operation. This in turn gives a process which is economical and most attractive for application on a commercial scale.

DETAILED DESCRIPTION OF THE INVENTION

Figure 1:
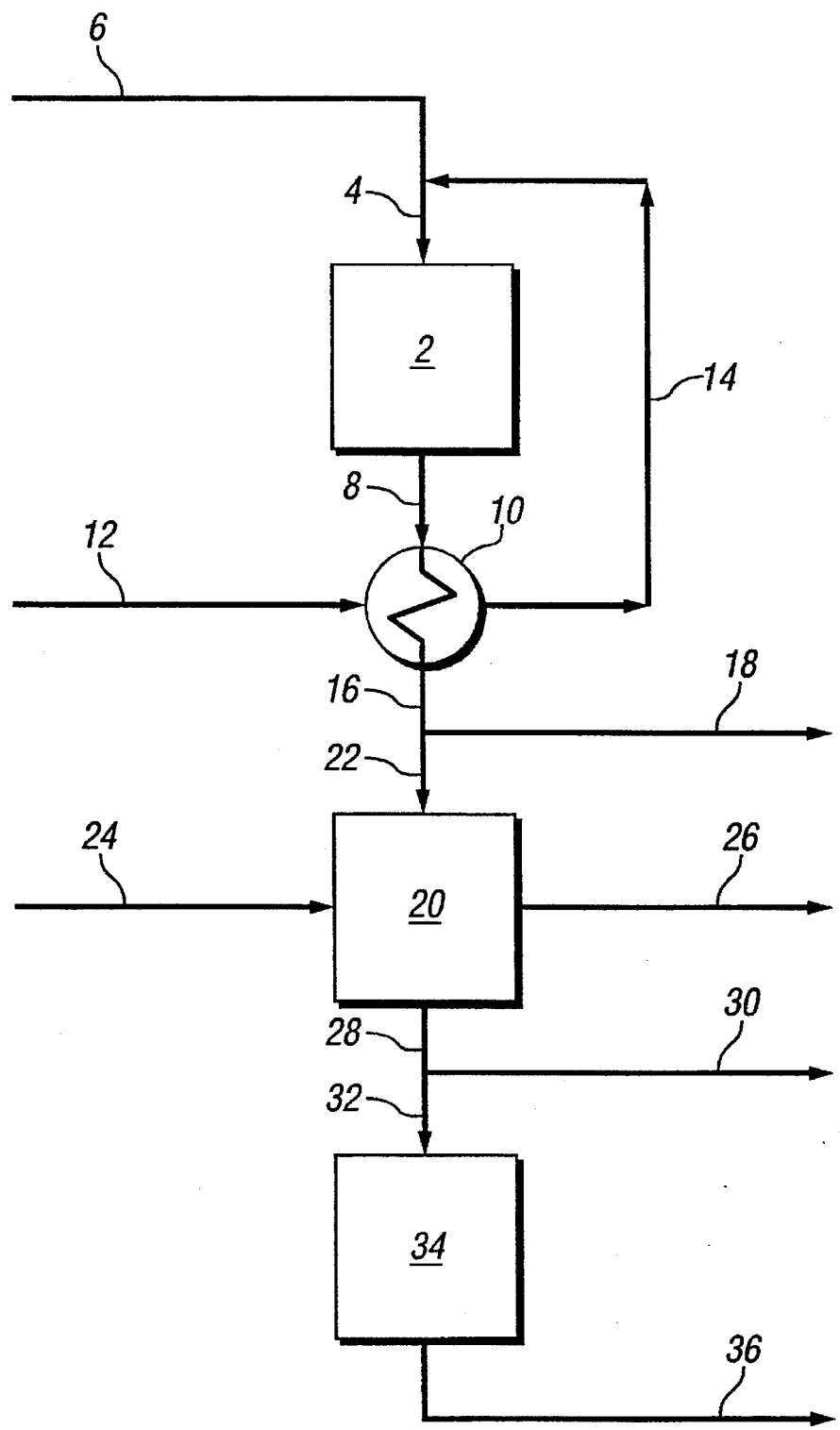
FIG. 1 is a schematic representation of one embodiment of the present process.

The process of the present invention may be used to prepare carbon monoxide and/or hydrogen from any gaseous hydrocarbon or hydrocarbon having a low boiling point such that it is gaseous under the conditions prevailing during the partial oxidation reactions. The process is particularly suitable for the partial oxidation of methane, natural gas, associated gas or other sources of light hydrocarbons. In this respect, the term "light hydrocarbons" is a reference to hydrocarbons having from 1 to 5 carbon atoms. The process may be applied in the conversion of naturally occurring reserves of methane which contain a substantial amount of carbon dioxide. The feed preferably comprises methane in an amount of at least 50% by volume, more preferably at least 75% by volume, especially at least 80% by volume.

In the first stage of the process, the hydrocarbon feedstock is contacted with an oxygen-containing gas during the partial oxidation process. Air may be used as the oxygen-containing gas, in which case nitrogen will be present in the feed and reaction mixture in large quantities. Alternatively, the use of substantially pure oxygen may be preferred, in which case nitrogen may be present in much lower, but nevertheless significant, quantities. Typically, the substantially pure oxygen is prepared on a commercial scale by the distillation of liquefied air. The amount of nitrogen present in the substantially pure oxygen will depend upon the operating conditions of the air distillation process. It is an advantage of the process of the present invention that the tolerances of the air distillation process may be relaxed, thereby allowing a greater amount of nitrogen to be present in the substantially pure oxygen being used in the catalytic partial oxidation process. This, in turn, offers advantages in terms of a reduction in the overall capital and operating costs of the air distillation plant.

The feed may optionally comprise steam.

The feed may comprise the hydrocarbon feedstock and oxygen in an amount sufficient to give a suitable oxygen-to-carbon ratio. Preferably, the oxygen-to-carbon ratio is in the range of from 0.3 to 0.8, more preferably from 0.45 to 0.75. References to the oxygen-to-carbon ratio refer to the ratio of oxygen in the form of molecules ($O_2$) to carbon atoms present in the hydrocarbon feedstock. Preferably, the oxygen-to-carbon ratio is in the range of from 0.45 to 0.70, with oxygen-to-carbon ratios of the stoichiometric ratio, 0.5, that is in the range of from 0.45 to 0.65, being particularly suitable.

If steam is present in the feed, the steam-to-carbon ratio (that is the ratio of molecules of steam ($H_2O$) to carbon atoms in the hydrocarbon) is preferably in the range of from above 0.0 to 3.0, more preferably from above 0.0 to 2.0.

The first stage of the process of the present invention may be operated at any suitable pressure. Preferably, the catalytic partial oxidation process is operated at elevated pressures, that is pressures significantly above atmospheric pressure. The process may be operated at pressures in the range of up to 150 bar. Preferably, the operating pressure is in the range of from 2 to 125 bar, more preferably from 3 to 100 bar.

The catalytic partial oxidation process may be operated at any suitable temperature. Under the preferred conditions of high pressure prevailing in the catalytic partial oxidation process, the feed gases are typically allowed to contact the catalyst at elevated temperatures in order to achieve the level of conversion required for a commercial scale operation. Accordingly, the process is preferably operated at a temperature of at least 950° C. Preferably, the operating temperature is in the range of from 950° to 1300° C., more preferably in the range of from 950° to 1200° C. Temperatures in the range of from 1000° to 1200° C. are particularly suitable.

The feed mixture may be provided during the catalytic partial oxidation process at any suitable gas space velocity. It is an advantage of the process of the present invention that very high gas space velocities may be applied in the first stage. Thus, typical space velocities for the catalytic partial oxidation process (expressed as normal liters of gas per kilogram of catalyst per hour) are in the range of from 20,000 to 100,000,000 Nl/kg/hr, more preferably in the range of from 50,000 to 50,000,000 Nl/kg/hr. Space velocities in the range of from 500,000 to 30,000,000 Nl/kg/hr are particularly suitable.

Catalyst compositions suitable for use in the catalytic partial oxidation of hydrocarbons are known in the art and generally comprise, as active component, a metal selected from Group VIII of the Periodic Table of the Elements. References in this specification to the Periodic Table of the Elements are to the CAS version, as published in the CRC Handbook of Chemistry and Physics, 68th Edition. Catalysts for use in the process of the present invention comprise, as the catalytically active component, a metal selected from rhodium, iridium and platinum. As has been discussed hereinbefore, these metals offer the significant advantage that substantially lower amounts of ammonia and hydrogen cyanide are produced during the catalytic partial oxidation reaction, compared with the other metals from Group VIII of the Periodic Table of the Elements. A catalyst comprising rhodium or iridium is a particularly suitable catalyst.

The catalytically active metal is most suitably supported on a carder. Suitable carrier materials are well known in the art and include the refractory oxides, such as silica, alumina, titania, zirconia and mixtures thereof. Mixed refractory oxides, that is refractory oxides comprising at least two cations may also be employed as carrier materials for the catalyst.

The catalytically active metal may be deposited on the refractory oxide carrier by techniques well known in the art. A most suitable technique for depositing the metal on the carrier is impregnation, which technique typically comprises contacting the carrier material with a solution of a compound of the catalytically active metal, followed by drying and calcining the resulting material.

The catalyst may comprise the catalytically active metal in any suitable amount to achieve the required level of activity. Typically, the catalyst comprises the active metal in an amount in the range of from 0.01 to 20% by weight, preferably from 0.02 to 10% by weight, more preferably from 0.1 to 7.5% by weight.

Any suitable reaction regime may be applied in the process of the first stage of the present invention in order to contact the reactants with the catalyst. One suitable regime is a fluidized bed, in which the catalyst is employed in the form of particles fluidized by a stream of gas. A preferred reaction regime for use in the process is a fixed bed reaction regime, in which the catalyst is retained within a reaction zone in a fixed arrangement. Particles of catalyst may be employed in the fixed bed regime, retained using fixed bed reaction techniques well known in the art. Alternatively, the fixed arrangement may comprise the catalyst in the form of a monolithic structure. A most preferred monolithic structure comprises a ceramic foam. Suitable ceramic foams for use in the process are available commercially. Further, alternative forms for the catalyst include refractory oxide honeycomb monolith structures.

In a preferred embodiment of the process of this invention, the feed is contacted with a catalyst retained in a fixed arrangement, which arrangement has a high tortuosity. The term "tortuosity" is a common term in the art which, when referring to a fixed catalyst bed, can be defined as the ratio of the length of the path taken by a gas flowing through the bed to the length of the shortest straight line path through the bed. Thus, the honeycomb monolith structures have a tortuosity of 1.0. For the purposes of the present invention, the term "high tortuosity" is a reference to arrangements having a tortuosity substantially greater than that of the honeycomb monolith structures, in particular a tortuosity of at least 1.1. A fixed bed of catalyst particles typically has a tortuosity of 1.5, whilst ceramic foams may be prepared having a tortuosity in the range of from 3.0 to 4.0, or even higher. In general, the tortuosity of the fixed bed arrangement is preferably in the range of from 1.1 to 10.0, more preferably to 5.0. A most suitable range of tortuosity is from 1.3 to 4.0.

It has been found that by employing the catalyst in a fixed bed arrangement having a high tortuosity allows the required conversion to be achieved with only a relatively very short contact time between the reacting gases and the catalyst. In this way, only a very low volume of catalyst is required, which in turn allows the very high gas space velocities of the present process to be easily achieved on a commercial scale.

It is a further preferred feature of the process of the first stage of this invention that the catalyst is retained in the form of a fixed arrangement having a large number of pores. In this respect, the term "pore" is a general reference to a space or interstice in the fixed arrangement between two adjacent portions of the catalyst. Thus, in the case of a fixed bed of catalyst particles, the term "pore" refers to the space between two adjacent particles. When referring to ceramic foams, the term pore refers to the openings or spaces between adjacent portions or lands of the ceramic structure. Thus, it will be appreciated that the pores referred to in respect of the present invention have a nominal diameter of the order of magnitude of 0.1 mm. These are to be contrasted with pores which may be present in the catalyst support material itself, which may be porous.

The fixed arrangement preferably comprises at least 750 pores per square centimeter. More preferably, the fixed arrangement comprises from about 1000 to about 15000 pores per square centimeter, especially from about 1250 to about 10000 pores per square centimeter.

During the first stage of the process, the gaseous mixture of the hydrocarbon feedstock and the oxygen-containing gas is preferably contacted with the catalyst under adiabatic conditions. For the purposes of this specification, the term "adiabatic" is a reference to reaction conditions in which substantially all heat loss and radiation from the reaction zone is prevented, with the exception of heat leaving in the gaseous effluent stream of the reactor.

In the second stage of the process of this invention, the product gases from the first stage are subjected to a treatment to remove the low amounts of ammonia and hydrogen cyanide produced in the catalytic partial oxidation process. Suitable processes for removing ammonia and hydrogen cyanide from gaseous streams are well known in the art. The removal of ammonia and hydrogen cyanide may be effected in a single stage or in a plurality of stages. If a plurality of stages are employed, the removal may be effected using the same or different processes in each stage.

One suitable process is absorption, in which the gaseous stream is contacted with a liquid solvent in a suitable column or other vessel. Suitable solvents for the absorption of ammonia and hydrogen cyanide are well known in the art. A most convenient and commonly applied solvent is water. To enhance the removal of ammonia, an aqueous solution of an acid, for example sulfuric acid, may be employed. To enhance the removal of hydrogen cyanide, an aqueous solution of a base, for example an alkali metal hydroxide, may be employed. The absorption may be carried out in a single stage or, alternatively, in a multi-stage operation. Suitable apparatus for carrying out the absorption process are well known in the art and include plate and packed columns. Operating conditions for the absorption process are well known in the art. The absorption may be effected at elevated pressure, most conveniently at substantially the same operating pressure as the catalytic partial oxidation reactor. The absorption may be effected at ambient or elevated temperatures. The temperature is preferably in the range of from ambient temperature to 100° C., more preferably from 25° to 75° C.

For a general discussion of absorption processes and techniques, reference is made to the Chemical Engineers' Handbook, Fifth Edition, edited by R. H. Perry and C. H. Chilton, pages 14-1 to 14-16.

An alternative process for the removal of ammonia and hydrogen cyanide from the gaseous product of the first stage is by adsorption using a solid adsorbent. Suitable adsorption processes and adsorbents for removing ammonia and hydrogen cyanide from gaseous streams are well known in the art. A most suitable adsorbent is activated charcoal. The adsorption process may be applied in a single stage or in a multi-stage process. Generally, the adsorbent is retained as a solid in a fixed bed arrangement, through which the gas being treated is passed. Suitable operating conditions for the adsorption process are well known to persons skilled in the art. The adsorption process may be carried out under any suitable pressure, most conveniently at substantially the same pressure as the catalytic partial oxidation reactor. Any suitable operating temperature may be applied during the adsorption process. Suitable temperatures include temperatures in the range of from ambient temperature to 100° C., in particular from 25° to 75° C.

For a general discussion of adsorption processes and adsorbents, reference is made to the Chemical Engineers' Handbook, Fifth Edition, edited by R. H. Perry and C. H. Chilton, pages 16-1 to 16-50.

Referring to FIG. 1, a catalytic partial oxidation reactor 2 comprising a catalyst retained in a fixed arrangement is supplied via line 4 with a feed mixture comprising substantially pure oxygen and a gaseous hydrocarbon feedstock, for example natural or associated gas. The substantially pure oxygen comprises a minor amount of nitrogen and is prepared by the distillation of liquefied air in a distillation unit (not shown) linked to the catalytic partial oxidation processing unit by line 6. The hot product stream of the catalytic partial oxidation reactor 2, consisting substantially of carbon monoxide and hydrogen is led via line 8 to a heat exchanger 10, in which the hot product stream is used to preheat the hydrocarbon feedstock fed to the heat exchanger 10 by line 12. The preheated hydrocarbon feedstock is supplied to the inlet of the catalytic partial oxidation reactor via line 14. The cooled product stream of the catalytic partial oxidation reactor is removed from the heat exchanger 10 via line 16.

At this point in the process, the product of the catalytic partial oxidation reactions contains small quantities of ammonia and hydrogen cyanide. A portion of the product may be removed via line 18 to serve as a feedstock to a process or operation in which carbon monoxide and/or hydrogen are utilized, but which is not affected by the presence of quantifies of ammonia or hydrogen cyanide. The remaining portion of the product stream is supplied to the gas inlet of an absorption unit 20 via line 22.

The absorption unit comprises a vertical column, in which is arranged a conventional packing or a series of plates. A solvent, most conveniently water, is fed to a liquid inlet of the absorption unit 20 via line 24. The absorption unit is conventionally arranged such that the product stream and the liquid solvent flow countercurrently through the packing or plates in the column. The liquid solvent, containing the absorbed ammonia and hydrogen cyanide, is removed from the absorption unit 20 via line 26. The cleaned product stream is removed from the absorption unit 20 via line 28.

At this point in the process, the product stream consists substantially of carbon monoxide and hydrogen, with only a very minor amount of ammonia and hydrogen cyanide, present in amounts of the order of a few parts per million. A portion of this product may be removed via line 30, to form the feed to one or more processes or operations in which carbon monoxide and/or hydrogen can be used while tolerating very minor amounts of ammonia and/or hydrogen cyanide. The remaining portion of the product stream is supplied via line 32 to the inlet of an adsorption unit 34.

The adsorption unit 34 comprises a fixed bed of an adsorbent, typically charcoal, retained in a vessel. The adsorbent is active in the adsorption of ammonia and hydrogen cyanide. The product stream is caused to flow through the adsorbent. The cleaned product stream is removed from the adsorption unit via line 36. If ammonia and/or hydrogen cyanide are present in the product stream leaving the adsorption unit 34, they are present only as trace components in amounts of the order of a few parts per billion. This product stream is suitable for use as a feed to processes utilizing carbon monoxide and hydrogen, but which are very sensitive to the presence of ammonia or hydrogen cyanide.

In a further aspect, the present invention relates to carbon monoxide or hydrogen whenever prepared by a process as hereinbefore described.

The present invention will be further described by the following examples which are included for illustrative purposes only and are not intended to limit the present invention. Examples 1 to 3 are examples of embodiments of the process of the present invention and Example 4 is for comparison purposes only.

EXAMPLES

Example 1

Catalyst Preparation 12.93 g of an aqueous solution, prepared by dissolving sufficient rhodium trichloride ($RhCl_3$) in water to give a rhodium concentration of 4.12% by weight, was concentrated by evaporation to a volume of 3.5 ml. Alpha alumina extrudates (1.0 mm diameter trilobes, commercially available ex. Dycat, 10 g) were impregnated by immersion in the aforementioned solution. The resulting extrudates were dried in an oven at a temperature of 120° C. and subsequently calcined at a temperature of 500° C. The resulting catalyst comprised 5.0% by weight rhodium.

Catalytic Partial Oxidation

A reactor was constructed comprising a transparent sapphire tube. The rhodium-containing catalyst prepared as hereinbefore described was crushed and loaded into the sapphire tube and retained in the form of a fixed bed of catalyst particles having a tortuosity of about 1.5. Methane and oxygen, in sufficient amounts to give an oxygen-to-carbon ratio of 0.61, were thoroughly mixed just before being introduced into the reactor to contact the fixed bed of catalyst. The mixture of methane and oxygen was fed to the reactor at a pressure of 3.2 bara and at a gas hourly space velocity (GHSV) of 1,400,000 Nl/kg/hr (Normal liters of gas per kilogram of catalyst per hour). The mixture comprised nitrogen in an amount sufficient to give a partial pressure of 0.33 bar.

The operating temperature of the catalyst bed was measured by optical pyrometry. The composition of the gas mixture leaving the reactor was determined by gas chromatography and weighing water condensed from the gas stream leaving the reactor. The conversion of methane and the selectivity of the process to carbon monoxide and hydrogen (on the basis of methane converted) was determined.

Ammonia and Hydrogen Cyanide Removal

The gaseous product stream of the catalytic partial oxidation reactor was cooled. Ammonia and hydrogen cyanide present in the product stream of the catalytic partial oxidation reactor were removed by an absorption treatment comprising two parallel stages. In the first stage to remove ammonia, a portion of the product stream was bubbled through an aqueous solution of sulfuric acid ($H_2SO_4$, 0.1N). In the second stage to remove hydrogen cyanide, operated in parallel to the first, a portion of the product stream was bubbled through an aqueous solution of potassium hydroxide (KOH, 10% by weight).

The operating conditions of the catalytic partial oxidation reactor and the results of the experiment are summarized in the Table hereinbelow.

Example 2

Using the same general procedure as described in Example 1, an iridium-containing catalyst was prepared by impregnation of the alpha-alumina extrudates using an aqueous solution of chloroiridic acid ($H_2IrCl_6$). The resulting catalyst comprised 5.0% by weight iridium.

The thus prepared catalyst was loaded into the apparatus and tested for activity in the catalytic partial oxidation of methane using the same general procedure as described in Example 1.

The gaseous product stream of the catalytic partial oxidation reactor was subjected to an absorption treatment as described in Example 1.

The operating conditions of the catalytic partial oxidation reactor and the results of the experiment are summarized in the Table hereinbelow.

Example 3

Using the same general procedure as described in Example 1, a platinum-containing catalyst was prepared by impregnation of the alpha-alumina extrudates using an aqueous solution of chloroplatinic acid ($H_2PtCl_6$). The resulting catalyst comprised 5.0% by weight platinum.

The thus prepared catalyst was loaded into the apparatus and tested for activity in the catalytic partial oxidation of methane using the same general procedure as described in Example 1.

The gaseous product stream of the catalytic partial oxidation reactor was subjected to an absorption treatment as described in Example 1.

The operating conditions of the catalytic partial oxidation reactor and the results of the experiment are summarized in the Table hereinbelow.

Example 4

Comparative Example

Using the same general procedure as described in Example 1, a ruthenium-containing catalyst was prepared by impregnation of the alpha-alumina extrudates using an aqueous solution of hexammine ruthenium (III) chloride ($Ru(NH_3)_6Cl_3$). The resulting catalyst comprised 5.0% by weight ruthenium.

The thus prepared catalyst was loaded into the apparatus and tested for activity in the catalytic partial oxidation of methane using the same general procedure as described in Example 1.

The gaseous product stream of the catalytic partial oxidation reactor was subjected to an absorption treatment as described in Example 1.

The operating conditions of the catalytic partial oxidation reactor and the results of the experiment are summarized in the Table hereinbelow.

As can be seen from the data set out in the Table, each of the metals rhodium, iridium, platinum and ruthenium is highly active in the catalytic partial oxidation of methane, giving both carbon monoxide and hydrogen in very high yields. It can also be seen that rhodium, iridium and platinum yield only very minor amounts of ammonia and only very minor amounts or, in the case of platinum, no detectable amounts of hydrogen cyanide during the catalytic partial oxidation reactions. In contrast, however, it can be seen that ruthenium combines a high level of activity and selectivity with a high yield of both ammonia and hydrogen cyanide.

TABLE

| Example No. | 1 | 2 | 3 | 4 |
|---|---|---|---|---|
| Active metal | rhodium | iridium | platinum | ruthenium |
| Catalytic Partial Oxidation Operation Conditions | | | | |
| Temperature (°C.) | 1040 | 1055 | 1080 | 1090 |
| Pressure (bara) | 3.2 | 3.2 | 3.2 | 3.2 |
| GHSV (1000 Nl/kg/hr) | 1400 | 1400 | 1400 | 1400 |
| oxygen/carbon ratio | 0.61 | 0.61 | 0.61 | 0.61 |
| $N_2$ partial pressure (bar) | 0.33 | 0.33 | 0.33 | 0.33 |
| $CH_4$ conversion (%) | 94.0 | 94.1 | 85.0 | 93.9 |
| CO selectivity (%)[1] | 92.9 | 92.9 | 93.5 | 92.8 |
| $H_2$ selectivity (%)[2] | 88.2 | 87.9 | 80.8 | 88.1 |
| HCN in product (ppmv) | 0.12 | 0.11 | 0.0 | 2.24 |
| $NH_3$ in product (ppmv) | 0.8 | 1.5 | 2.6 | 21.0 |

[1] selectivity to CO based on $CH_4$ conversion
[2] selectivity to $H_2$ based on $CH_4$ conversion

What is claimed is:

1. A process for the preparation of carbon monoxide and/or hydrogen from a hydrocarbon feedstock, which process comprises subjecting the hydrocarbon feedstock in a first stage to a catalytic partial oxidation process comprising contacting a gaseous mixture comprising the hydrocarbon feedstock and an oxygen-containing gas, which gaseous mixture also comprises nitrogen, with a catalyst comprising as a catalytically active metal rhodium, iridium or platinum and subjecting at least a portion of the products of the first stage in a second stage to a process in which ammonia and/or hydrogen cyanide is removed.

2. The process of claim 1 wherein in the first stage the hydrocarbon feedstock comprises methane, natural gas, associated gas or a source of light hydrocarbons.

3. The process of claim 1 wherein in the first stage the oxygen-containing gas is substantially pure oxygen.

4. The process of claim 1 wherein in the first stage the feed comprises the hydrocarbon feedstock and the oxygen-containing gas in amounts giving an oxygen-to-carbon ratio of from 0.3 to 0.8.

5. The process of claim 1 wherein in the first stage the feed is contacted with the catalyst at a pressure in the range of up to 150 bar.

6. The process of claim 1 wherein in the first stage the feed is contacted with the catalyst at a temperature in the range of from 950° to 1300° C.

7. The process of claim 1 wherein in the first stage the feed is contacted with the catalyst at a gas hourly space velocity in the range of from 20,000 to 100,000,000 Nl/kg/hr.

8. The process of claim 1 wherein in the first stage the catalyst comprises rhodium or iridium.

9. The process of claim 1 wherein in the first stage the catalyst is retained in a fixed arrangement.

10. The process of claim 9 wherein the fixed arrangement of the catalyst has a tortuosity in the range of from 1.1 to about 10.0.

11. The process of claim 9 wherein the fixed arrangement of the catalyst has from about 1000 to about 15000 pores per square centimeter.

12. The process of claim 1 wherein in the first stage the feed is contacted with the catalyst under substantially adiabatic conditions.

13. The process of claim 1 wherein in the second stage ammonia and/or hydrogen cyanide are removed by absorption or adsorption.

14. A process for the preparation of carbon monoxide and/or hydrogen, which process comprises:

a) in a first stage, contacting at elevated temperature and pressure a mixture comprising oxygen, nitrogen and a feedstock selected from the group consisting of methane, natural gas, associated gas and light hydrocarbons oxygen and nitrogen with a catalyst comprising a catalytically active amount of a metal selected from rhodium or iridium, which catalyst is retained in a fixed arrangement having a high tortuosity, to yield a product comprising carbon monoxide, hydrogen, ammonia and hydrogen cyanide; and b) in a second stage, contacting at least a portion of the product with an absorbent or an adsorbent active in removing ammonia and/or hydrogen cyanide from the product.

* * * * *